Charles F. Johnson
INVENTOR.

BY Murray Robinson

ATTORNEY

May 26, 1959
C. F. JOHNSON
2,887,754
PIPE ANCHOR
Filed May 14, 1954
10 Sheets-Sheet 2
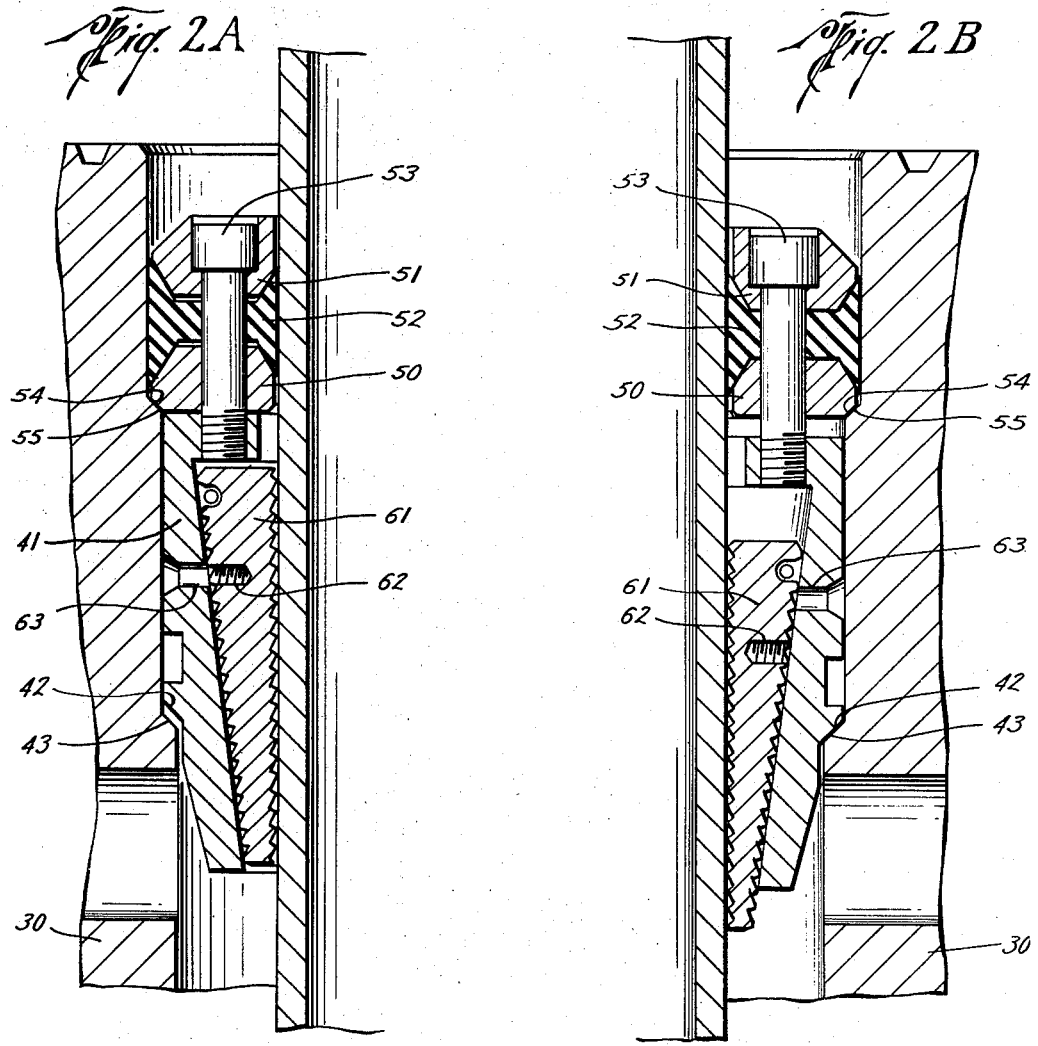
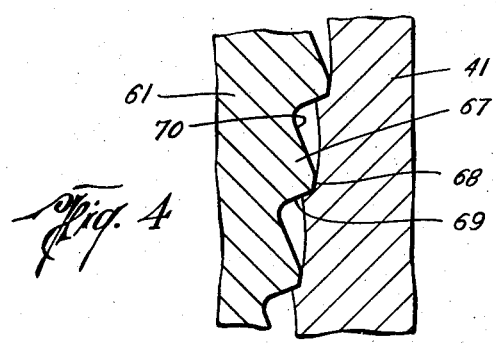
Charles F. Johnson
INVENTOR.
BY Murray Robinson
ATTORNEY May 26, 1959

C. F. JOHNSON 2,887,754

PIPE ANCHOR

Filed May 14, 1954

Charles F. Johnson
INVENTOR.

BY Murray Robinson

ATTORNEY

May 26, 1959 C. F. JOHNSON 2,887,754
PIPE ANCHOR
Filed May 14, 1954 10 Sheets-Sheet 4
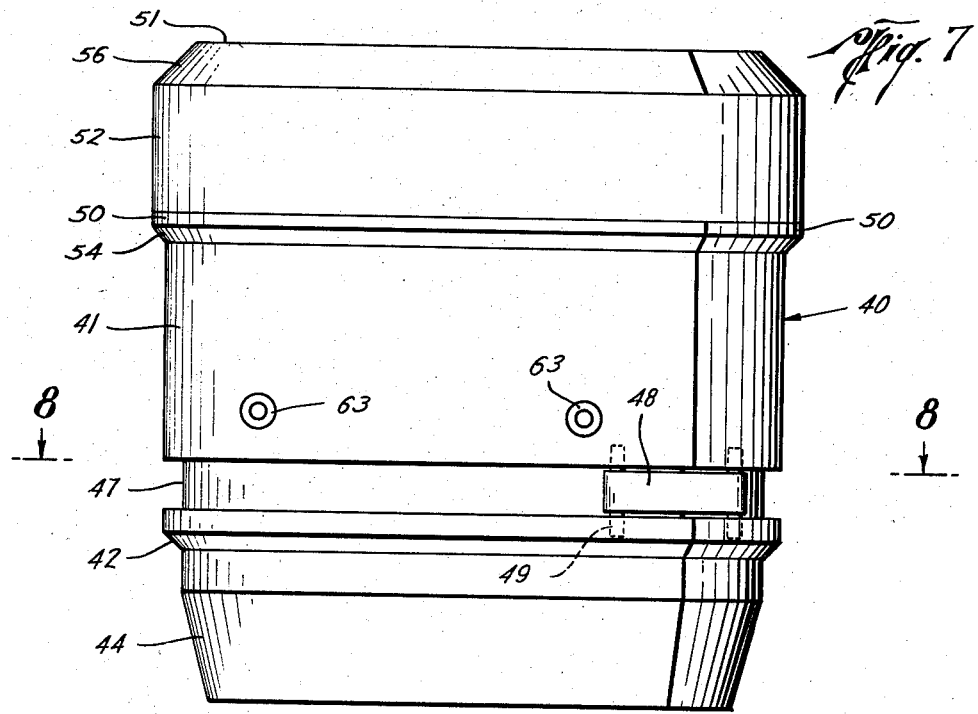
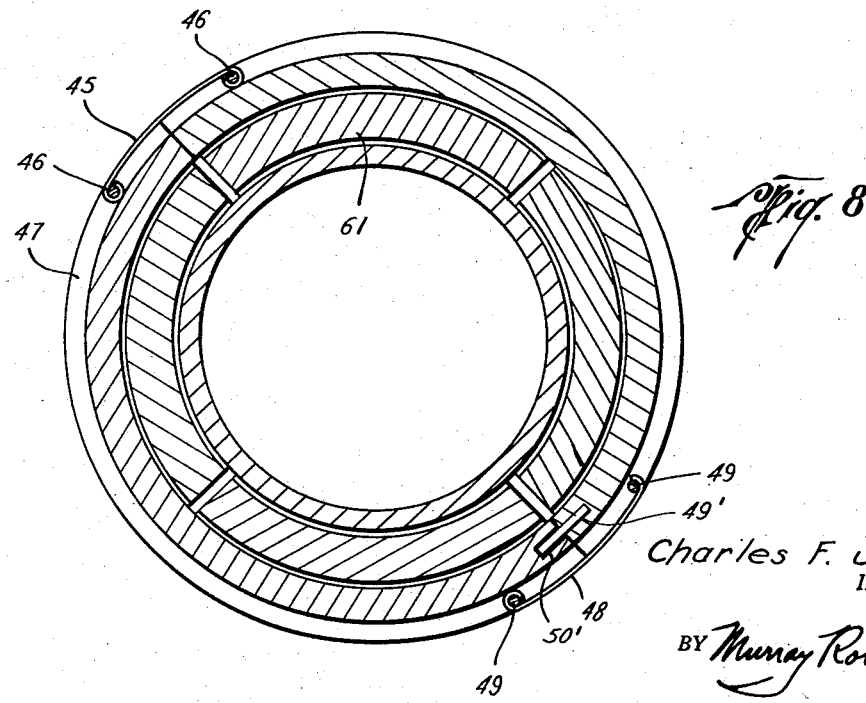
Charles F. Johnson
INVENTOR.
BY Murray Robinson
ATTORNEY May 26, 1959  C. F. JOHNSON  2,887,754
PIPE ANCHOR
Filed May 14, 1954  10 Sheets-Sheet 5
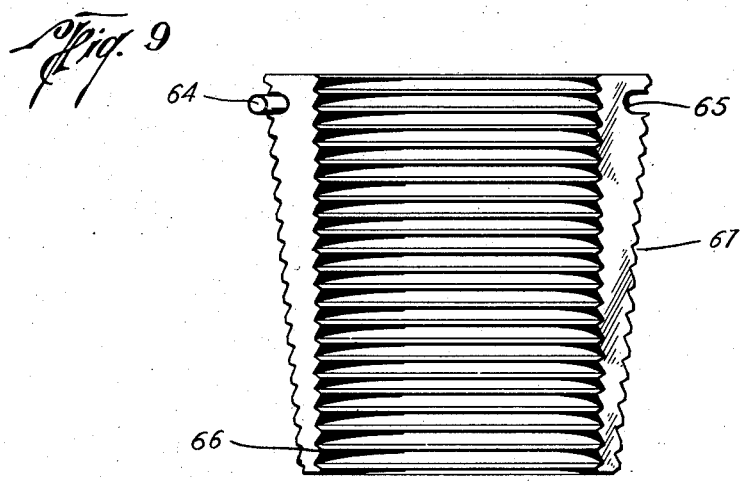
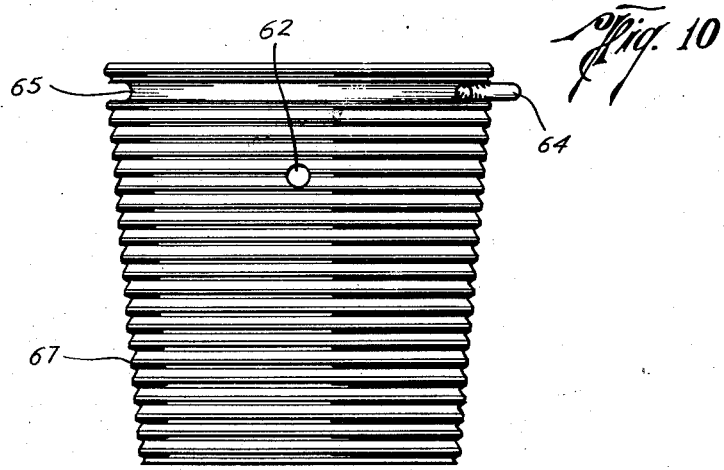
Charles F. Johnson
INVENTOR.
BY Murray Robinson
ATTORNEY Charles F. Johnson
INVENTOR.

BY Murray Robinson

ATTORNEY

May 26, 1959 C. F. JOHNSON 2,887,754
PIPE ANCHOR
Filed May 14, 1954 10 Sheets-Sheet 7
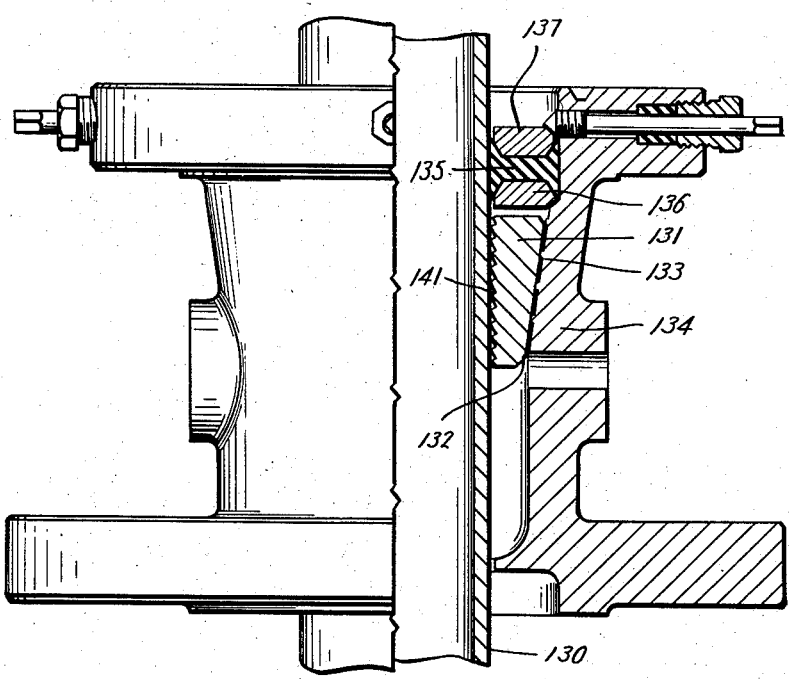
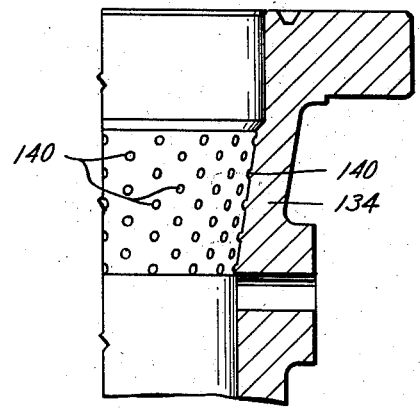
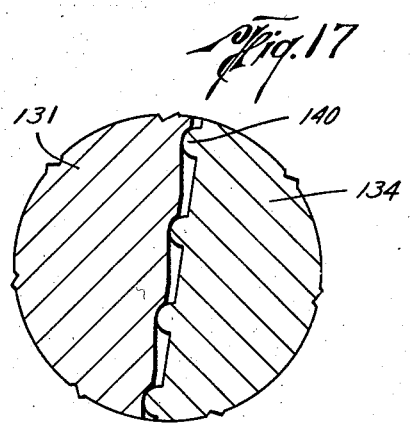
Charles F. Johnson
INVENTOR.
BY Murray Robinson
ATTORNEY May 26, 1959

C. F. JOHNSON 2,887,754

PIPE ANCHOR

Filed May 14, 1954

Charles F. Johnson
INVENTOR.

BY Murray Robinson

ATTORNEY

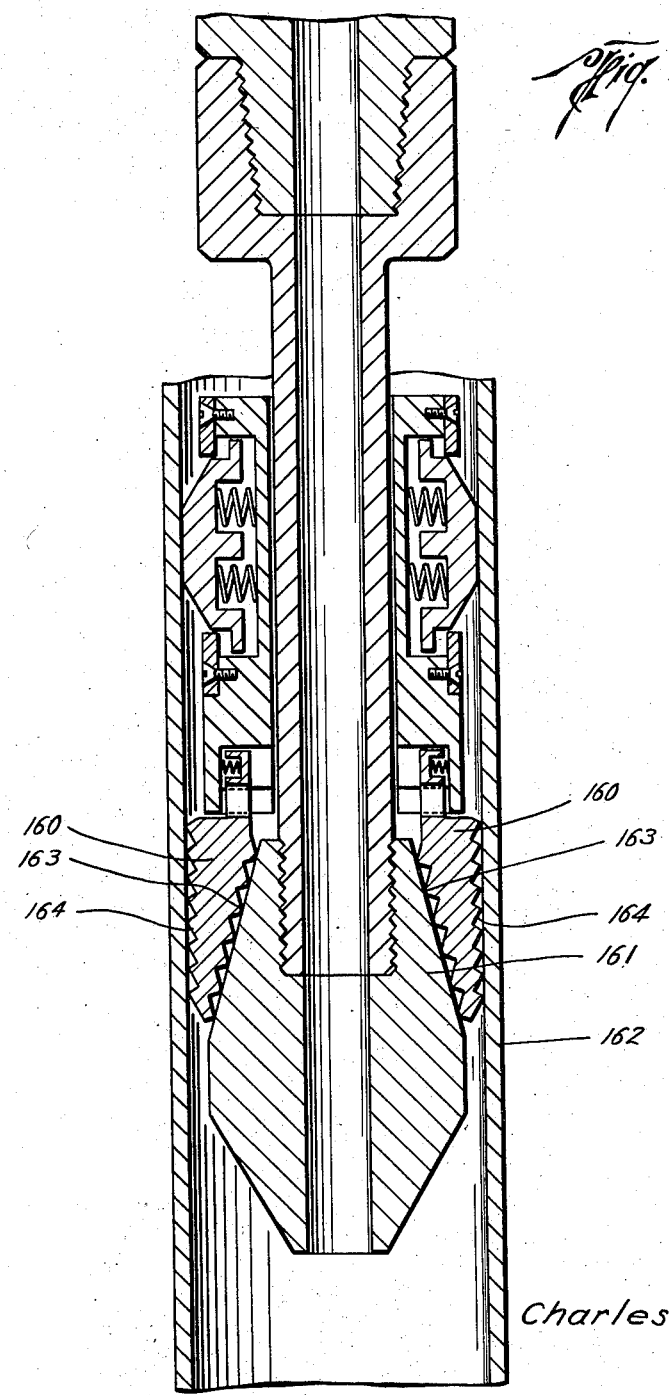

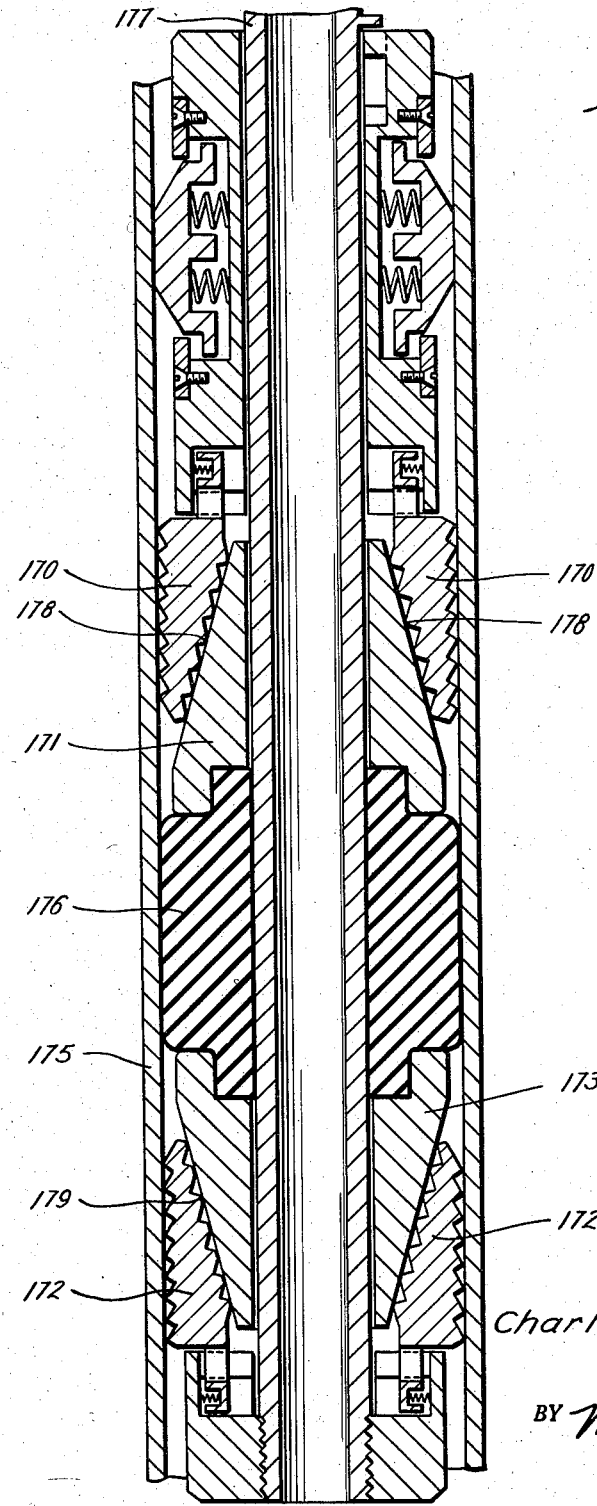

2,887,754
PIPE ANCHOR

Charles F. Johnson, Houston, Tex., assignor, by mesne assignments, to McEvoy Company, Houston, Tex., a corporation of Texas Application May 14, 1954, Serial No. 429,870

22 Claims. (Cl. 24—263)

This invention pertains to wells and more particularly to anchoring devices used therein, e.g. devices for suspending casing from a well head, devices for holding a packer in position in a casing, devices for connecting a fishing tool to a fish as in spears and overshots.

More specifically, the invention pertains to anchoring devices of the type utilizing slips for engaging a pipe and transferring load between the pipe and the support for the slips.

A slip is a wedge having a pipe engaging or front face which is a generally cylindrical surface with means such as sharp circumferentially extending teeth thereon to engage a pipe by indentation of the surface thereof sufficient to prevent relative axial motion of the pipe and slip, the back face of the wedge, which faces away from the pipe being tapered, that is, having a surface which is at an angle to the axis of the cylindrical front face. Usually the back face of the slip is conical with the cone axis concentric with the axis of the cylindrical front face. Slips are also known in well apparatus having plane back faces; however, where a plurality of slips are used disposed around the outside or the inside of the pipe to be engaged as shown in the embodiments of the invention hereinafter illustrated, as a practical matter having reference to the maximum utilization of the available space, the back faces of the slips will have generally conical surfaces. According to whether the slips are to engage the interior or exterior of the pipe, the cylindrical front faces thereof will be convex or concave and the conical back faces thereof will be concave or convex, just the opposite from the front faces.

Usually a slip is an integral construction. However composite slips are also known, as shown for example in United States Patent Number 2,061,771 issued April 4, 1936 to George T. McLagan. Therefore a slip may be considered to be a combination of pipe engaging means, support engaging means, and means for transferring load between the pipe engaging means and the support engaging means.

Also, slips are usually arcuate segments of one hundred twenty degrees or less and used in sets circumferentially disposed around the pipe to be engaged, with spaces between the sides of the slips to permit them to move radially in and out. However, slips are also known of greater than 360 degrees extent such as shown for example in United States Patent 2,670,797 issued March 2, 1954, to A. L. Armentrout.

Difficulty has been experienced with slip suspension of well casing when the casing is of great weight, as in very deep wells, the difficulty being a tendency of the casing to collapse or "bottleneck." Similar troubles may be encountered in the use of overshot fishing tools if great forces are required to free the fish. The reverse type of problem may be encountered with spears and packers where excessive axial loading may cause bursting of the fish or casing as the case may be.

The most important application of the invention is in slip suspension of casing in a casing head and this example will be discussed in the following, bearing in mind that the theory is of general application. In this illustrative case it is desired to reduce the final radial unit pressure of the slips on the casing for any given weight of casing so that the reduction in casing diameter will not exceed the maximum permissible value for the maximum weight of casing that can be hung in the well.

The terminology "final radial unit pressure" is used because the hanging of casing by means of slips is not an instantaneous process but occupies a brief period of time and initially the only radial force acting on the pipe is that due to the weight of the slips and the friction between the casing and slips as the casing is lowered. It is only after the pipe gripping teeth (wickers) on the front faces of the slips have sufficiently indented the pipe to hold it against relative motion that the full final radial force of the slips on the pipe is exerted.

The maximum permissible reduction of casing diameter may be determined by the necessary clearance for passage of full gage tools therethrough as is necessary for performing operations inside the casing after it is hung. Another determining factor is that the reduction in diameter must not be such as to correspond to stresses exceeding the yield point wherein further plastic deformation occurs without increased loading resulting usually in the casing pulling apart. Which of these two factors is controlling will depend on the strength and thickness of the casing wall.

The maximum weight of casing that can be hung in a well is to be judged by the strength of the coupling joints. It is desirable that the slip suspension be such as to permit a weight of casing to be hung equal to the coupling strength without exceeding the maximum permissible reduction in casing diameter.

Two possible ways of reducing the final radial unit pressure of the slips on the casing are increase of area of contact of slips and pipe to better distribute the load and reduction of the total radial component of the slip force against the pipe. When either of these methods is tried, difficulties are encountered as will be explained.

The radial component of the slip force on the pipe is equal and opposite to the radial component of the pipe reaction on the slips. A consideration of the forces in equilibrium acting on a slip as a free body will therefore be helpful in investigating the problem. The forces acting on a slip supporting a casing from a casing head consist of the weight of the slip, the reaction of the pipe, and the reaction of the supporting bowl in the casing head; the slip transferring load from the pipe to the bowl. After the casing has been hung the weight of the slips is negligible compared to the other forces involved, so that there must be equilibrium established between the pipe reaction and the bowl reaction. Since the radial component of the pipe reaction must be equal and opposite to the bowl reaction, we can turn our attention to the latter.

There being sliding contact between the back of the slip and the bowl, the bowl reaction may be resolved into two components, one normal to the bowl and a friction component parallel to an element of the surface of the bowl. Therefore the radial component of the bowl reaction will be reduced as the taper angle of the bowl increases and as the friction angle of the bowl increases, the latter angle being the angle whose tangent is the coefficient of friction between slip and bowl.

It has been determined mathematically that the answer to the foregoing problems does not lie in increased taper on the backs of the slips, for this reduces the length of the slips and causes corresponding increased unit stress on the pipe contacted by the front of the slips. In this connection it is to be noted that in wells the radial distances are fixed which is the reason increased taper means shorter slips. Likewise, increased length of slips with more gradual taper is not the answer because the radial forces tend towards infinity as the taper approaches zero, so that although contact area between slips and pipe is increased with longer slips, the unit stress remains the same or increases. Again it is to be observed that in a well where radial distances are fixed, increased length requires less taper on the slips.

One solution of the problem has been the use of step backed slips in order to overcome the limiting factor of radial distance in the well. With such slips greater length can be achieved without reduction of taper. This solution of the problem presents manufacturing difficulties because of the necessity of aligning the successive steps on the slip backs so as to make them all seat at once. The close tolerances required cause the cost to be high. Furthermore, if, through manufacturing error, tolerances are not maintained, all of the tapered portions on the backs of the slips will not seat simultaneously resulting in a slip of short effective length which will cause the pipe to be collapsed or burst as the case may be. This solution of the problem may therefore be considered to be unreliable.

Another solution that has been proposed is to increase the coefficient of friction between the backs of the slips and the surface of the bowl of the casing head by rough machining the bowl. However, this solution has been a failure because it prevents the slips from gripping the pipe enough to hold the pipe from moving. To fully understand the reason for this requires a consideration of the transient conditions occurring during the setting of the slips.

The back of a slip is adapted to engage a support which is either at a fixed radial distance from the surface of the pipe to be engaged by the front of the slip or at most has but a limited amount of possible motion relative thereto so that upon axial motion of the slip relative to the support in the direction the slip tapers down. The consequent radial motion of the slip toward the pipe will ultimately cause the teeth or other means on the front face of the slip to indent the pipe and prevent relative axial motion of the pipe and slip.

In the cases of the suspension of casing in a well head or the engagement of an overshot fishing tool with a pipe, there are usually only two forces available for causing slip motion relative to the support: (1) weight of the slip, (2) friction between the slip and pipe as they move axially relative to each other prior to the front face of the slip indenting the pipe. In the case of packers and spears there usually is added to these the force of friction between the pipe and spring loaded drag blocks or wiper springs, which in the following will be considered as part of the weight of the slips. The above mentioned two forces act axially and their components normal and parallel to the support surface vary as the taper of the bowl. The greater the taper angle the larger the normal force and the less the parallel force. Any frictional or analogous force resisting relative motion between the slip and support parallel to the support surface must be overcome by the component of the above enumerated forces tending to move the slip parallel to the support surface. If the latter is insufficient the slip will not move relative to the support and hence will not move in radially to indent the pipe and the slip will be inoperative.

The frictional resistance to relative motion of the slip and support depends on the normal force holding them in engagement. As previously stated, this normal force is initially a component of the weight and pipe friction forces acting on the slip and increases as the taper angle of the support increases. Therefore, increasing the bowl taper angle both lowers the parallel component of these forces and increases the normal component, both changes reducing the net force tending to move the slip.

The frictional resistance to slip motion also increases with increase of the coefficient of friction for the engaged surfaces of slip and support.

As the slip moves relative to the support the radial motion of the slip relative to the pipe causes the pipe to begin to indent and a radial force due to the reaction of the pipe on the slip is added to the previous friction force due to their relative motion. This increases the total frictional resistance to motion of the slip relative to the support. If the force of frictional resistance due to relative motion of the slip and pipe does not increase as fast or faster due to the indentation of the pipe than the frictional resistance to motion of the slip relative to the support, the latter will soon prevail and the slip will stop moving relative to the support and hence will stop indenting the pipe and the pipe will not be gripped by the slip enough to prevent relative motion of pipe and slip.

With a rough machined bowl, the coefficient of friction is so large that either the initial resistance to slip motion is sufficient to hold the slips stationary despite the force of the slip weight and pipe friction or else the force of resistance to slip motion increases faster than the force between pipe and slip and predominates before the pipe has been indented sufficiently to be held against motion. In this latter case the slip merely removes a layer of scale and metal from the pipe as it slides through.

It is the object of this invention to provide a device for anchoring to pipe that will overcome the difficulties previously outlined of pipe bottlenecking, collapse or bursting, which will be reliable and simple to operate, and which will be inexpensive and easy to manufacture.

According to the invention friction control means is provided between the back faces of the slips and the surface of the slip bowl to cause the coefficient of friction to be initially low enough to cause the slips to set, that is, indent and hold the pipe against relative motion, and thereafter to increase to such a value that the downward and hence inward motion of the slips is insufficient to cause reduction of casing diameter beyond the permissible amount even when the maximum weight of casing is hung on the slips.

Other objects and advantages of the invention will become apparent from the following description of a preferred embodiment thereof, reference being had to the accompanying drawings wherein:

Figures 2A and 2B are enlarged sectional views showing portions of the casing suspension illustrated in Figure 1, and illustrating the slips thereof in unset and set positions respectively;

Figures 3 and 4 are sectional views on a still larger scale showing portions of the casing suspension in unset and set positions respectively;

Figure 1:
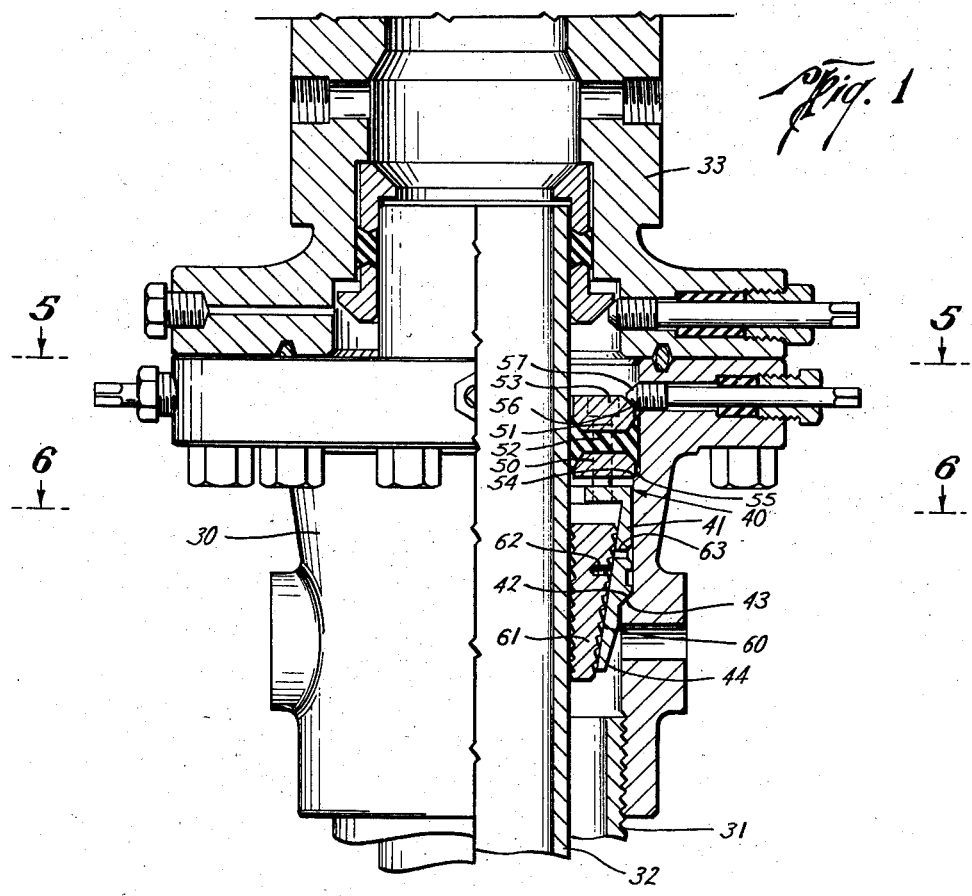
Figure 1 is an elevation partly in section, of a well head incorporating a casing suspension embodying the invention.
Figure 5:
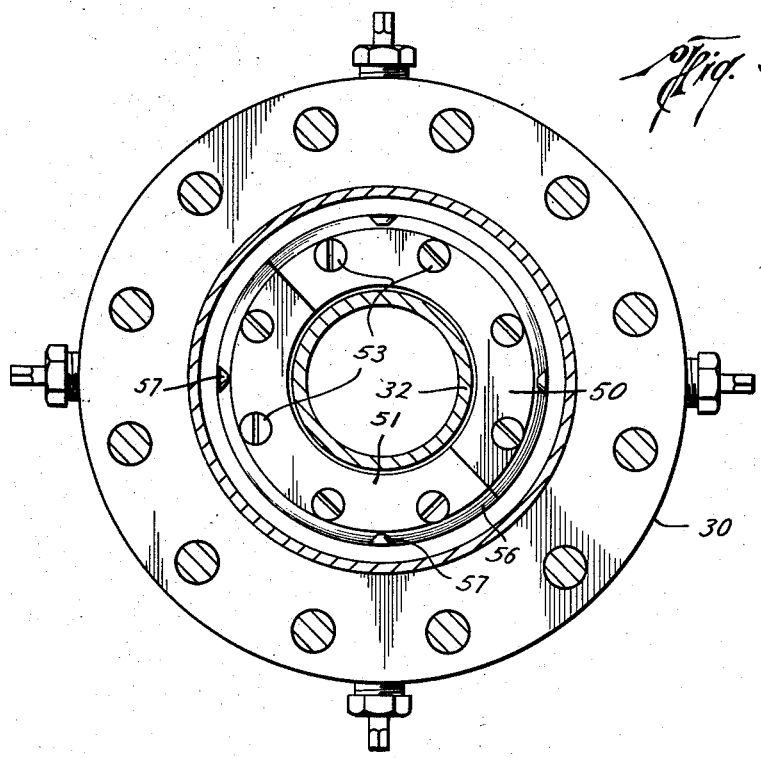
Figure 6:
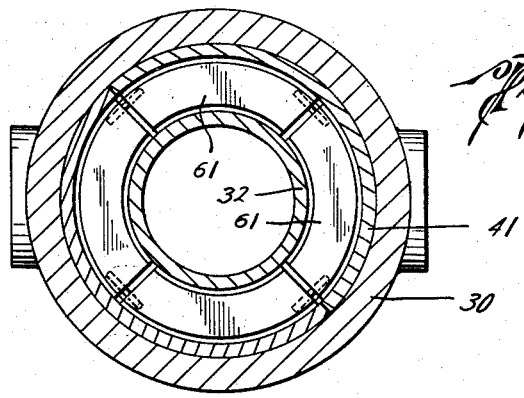
Figure 11:
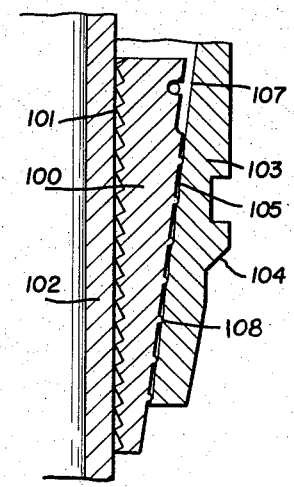
Figure 12:
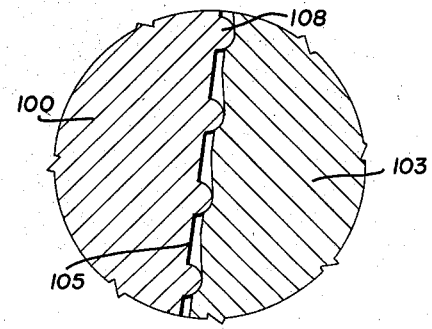
Figure 13:
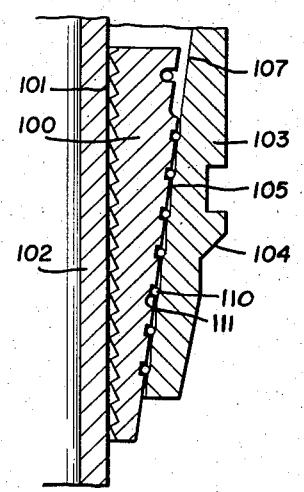
Figure 14:
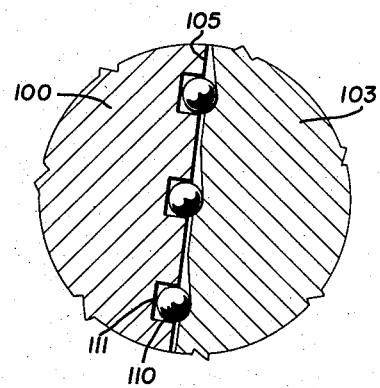
Figure 18:
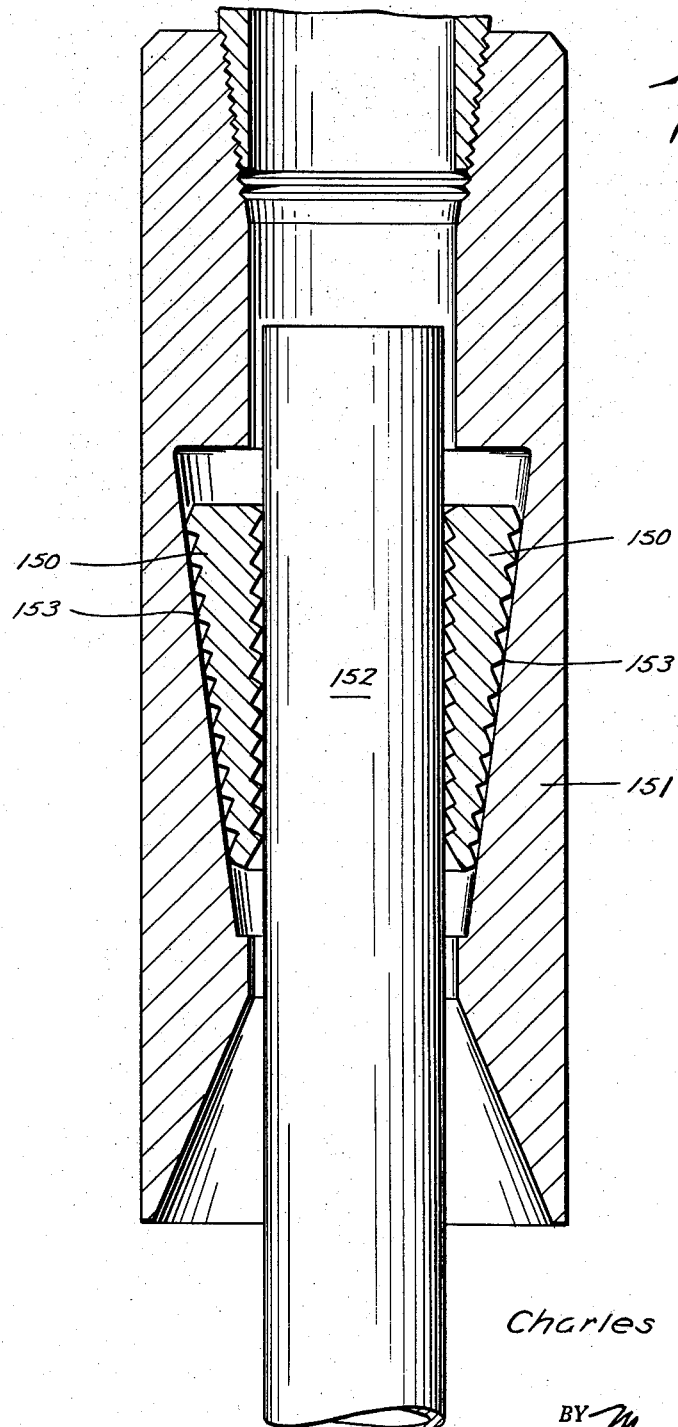

Figures 5 and 6 are horizontal sections taken along lines 5—5 and 6—6 of Figure 1;

Figure 7 is an elevation showing a casing hanger of the type illustrated in Figure 1;

Figure 8 is a top view of the casing hanger shown in Figure 7 and showing a set of slips disposed therein;

Figures 9 and 10 are front and back views of one slip of a set of slips embodying the invention, of the type shown in Figure 1;

Figure 11 is an enlarged fragmentary detail in vertical section through a slip and hanger showing a modification;

Figure 12 is a further enlargement of a portion of the detail shown in Figure 11;

Figure 13 is a view similar to Figure 11 illustrating still another embodiment;

Figure 14 is an enlargement of a portion of Figure 13;

Figure 15 is an elevation partly in vertical section, showing a well head embodying a modified form of the invention;

Figure 16 is a detail showing a portion of the well head shown in Figure 15;

Figure 17 is an enlarged vertical sectional view showing a portion of the apparatus shown in Figure 15;

Figure 18 is a vertical section showing an overshot embodying the invention;

Figure 19 is a vertical section showing a spear embodying the invention; and

Figure 20 is a vertical section showing a permanent type packer embodying the invention.

Referring first to Figure 1 there is shown a casing head 30 secured to the upper end of a string of casing 31. Supported by and sealed to the casing head is the upper end of another string of casing 32 disposed inside the casing head and extending thereabove into the lower portion of tubing head 33. Casing 32 is also sealed to the tubing head.

Referring now also to Figure 7, the means for sealing between the casing head 30 and casing 32 includes a casing hanger 40 which comprises a hollow bowl 41 of generally circular cross section having upper and lower outer cylindrical portions separated by a conical shoulder 42 adapted to seat on a similar conical shoulder 43 inside the casing head. The lower end of the bowl 41 is conical on its exterior as shown at 44 to guide the bowl into place when it is lowered into the head.

As best shown in Figure 8, the bowl is preferably made in two halves which are pivotally connected together at one side by a spring steel double pintle hinge 45 whose pintles 46 are welded into recesses cut into the bowl above and below a channel 47, the channel being an easily machined space for the pintles and hinge to work in. At the opposite side from hinge 46 a spring steel latch 48 is pivotally and snap connected respectively to pins 49 mounted similarly to pins 46. A dowel pin 49' disposed in one half of the bowl adjacent latch 48 is adapted to enter a hole 50' in the other half of the bowl to help maintain alignment of the two halves of the bowl.

Referring again to Figures 1 and 7, and also to Figure 5, to the upper end of the bowl 41 is secured a means for sealing between the casing and casing head comprising a support ring 50, a compression ring 51 and a ring 52 of rubber-like sealing material such as neoprene disposed therebetween. The three rings of the sealing means are held together and to each other by means of a plurality of screws 53 screwed through the rings into the top of bowl 41. The rings are free to slide up and down on the screws 53. The support ring 50 has a bevel surface 54 around its lower outer periphery adapted to seat on a conical shoulder 55 inside the casing head 30. With the support ring thus seated, tension on screws 53 due to load on the bowl causes the compression ring to move down and expand the sealing ring horizontally to seal between the casing and casing head. The compression ring 51 also has a bevel surface 56 around its upper outer periphery on which bear lock screws 57, by means of which the compression ring can be forced down or held down to make or maintain the seal and retain the hanger in the casing head.

As shown in Figures 5 and 7, rings 50 and 51 are each preferably made in two halves, and ring 52 is split adjacent one of the junctures of the two halves of rings 50 and 51. The part of ring 52 adjacent the other juncture of the two halves of rings 50 and 51 serves as a hinge. Since ring 52 is fairly stiff and tends to retain its circular shape no latch is needed for the part of the sealing means that opens up to receive the casing.

Referring now to Figures 1, 9, and 10, the interior of bowl 41 is provided with a recess having a conical surface 60 within which are disposed a plurality of slips 61. Each slip is provided with a tapped recess 62 which can be aligned with one of a plurality of holes 63 through the bowl 41, whereby a screw, not shown, can be passed through hole 63 into recess 62 to retain the slip in the bowl and hold it in elevated, i.e., retracted position as shown in Figure 2A. These screws are removed after the hanger is placed around the casing and before it is lowered into the casing head. The slips are maintained in vertical alignment by the engagement of a pin 64 welded to one side of each slip with a groove 65 in the adjacent slip.

The inner or front face of each slip is provided with a plurality of teeth 66 which are preferably upwardly pointing, that is, the medians or lines connecting the midpoints of the crests with the midpoints of the roots pointing outwardly up. The teeth preferably are of modified buttress thread cross-section. In fact each set of slips is conveniently formed from an integral sleeve which is turned with an internal buttress thread before it is cut into four segments to form the slips.

Figure 3:
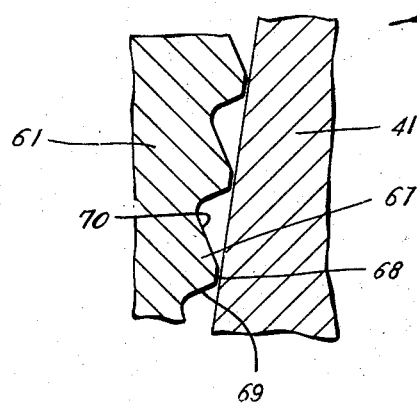

On the outside or back face of each slip there are formed a plurality of teeth 67. These are preferably downwardly pointing and also of modified buttress thread cross section and having flat crests 68 as best shown in Figure 3. These teeth are also conveniently formed by cutting a helical thread on the exterior of a sleeve that is later cut into segments to form a set of slips. Although the teeth 67 are downwardly directed, they are what may be termed unloading teeth, in that the angles between the teeth flanks 69 on the lower sides of the teeth and the base material are obtuse angles. The teeth are also unloading with reference to their upper flanks 70. By making the active areas of the teeth unloading, that is, by making unloading the parts that engage the opposing metal of the hanger 41, there is no wedging action tending to make the teeth dig in farther when moved transversely, that is, parallel to the surface of the opposing metal. The combined area of the crests of teeth 67 is greater than the combined area of the crests of teeth 66.

Referring again to Figure 2A, in the unstressed condition the top of bowl 41 is in contact with support ring 50 and the distance between beveled surface 54 and shoulder 42 is less than the distance between shoulders 55 and 43. When the hanger is placed in the casing head it seats first on shoulder 55. Then, when the casing is lowered and the slips are pulled down in the bowl as shown in Figure 2B, the bowl seats on shoulder 43 and the screws 53 draw the compression ring 51 down to expand the seal ring radially against the casing head and the casing to seal therebetween. This mode of automatic sealing is disclosed and claimed in United States Patent No. 2,824,757, issued February 25, 1958. The seating of the bowl on shoulder 43 limits the degree of loading of the sealing means including the seal ring 52 and the tension screws 53.

Referring now to Figures 3 and 4, there is illustrated the action of the back teeth 67 on the backs of the slips 61. As shown in Figure 3, initially the flat crests 68 of the teeth slide down in the bowl 41 as load is applied by the front teeth of the slips gripping the casing. Then as the load increases, the stress at the area of contact between the crests 68 and the bowl 41 exceeds the yield point of the material of the bowl and the teeth 67 dig in as shown in Figure 4. The engagement of teeth 67 with the bowl 41 retards further downward movement of the slips compared to the movement that would take place if the backs of the slips were smooth and thereby prevents excessive radial inward motion of the slips under maximum casing weight permissible so that the casing will not be collapsed. The prevention of excessive deformation of the casing not only insures that the casing will not be parted and that full gage tools can be passed therethrough, but also insures that the seal between the casing and seal ring 52 will be maintained.

It is to be noted that slips are usually heat treated so as to make them hard and strong. This is to enable the front teeth 66 to bite into the casing. It is therefore no extra trouble to provide hardened back teeth 67 which are heat treated at the same time as the rest of the slip. Since teeth 67 are harder and stronger than the slip bowl, the yield point of the slip bowl is lower than that of the slip teeth and on increasing load the bowl yields while the teeth are still below their yield point and the teeth bite into the bowl.

Referring now to Figures 11 through 14 there are shown alternative constructions of the slips and bowl. In each of these cases the front face of each slip 100 is provided with preferably upwardly directed teeth 101 to engage casing 102 the same as in the Figures 1 and 4 embodiment. Also, the outside or back face of the bowl part 103 of each hanger is provided with a steeply tapered seat 104 like the shoulder 42 in the first described embodiment. However the backs of the slips are provided with rounded protuberances each symmetrical in all directions about a line normal to the center of the crest thereof rather than with flat crested teeth or protuberances as in the previously described embodiment.

The slips of Figures 11 through 14 are each provided at their inner surfaces with sharp teeth in the same manner as previously described in connection with the embodiment of Figures 1 and 4. However, the backs of the slips are provided with rounded protuberances symmetrical in all directions about a line normal to the center of the crest thereof.

More specifically, in Figures 11 and 12, the teeth 108 formed on the back of the slip 100 are rounded and are hemispherical in cross-sectional outline. Such teeth are capable of operation in accordance with the purposes of this invention to initially slideably engage the relatively softer surface 107 of the bowl and finally to gallingly engage the surface to plastically deform the same as shown in Figure 12 of the drawings. In Figure 12, the bowl 103 and the slips 100 are illustrated in their final set condition.

In that embodiment illustrated in Figures 13 and 14 of the drawings, the teeth are again rounded, but are provided by balls 110 disposed in peripheral slots 111 formed in the slip 100. Although the balls 110 are free to move rotationally relative to the slip 100, they have the same effect as the teeth 108 and their engaging characteristics are substantially the same as other teeth of the present invention.

All in all, the operation of the embodiments of Figures 11–14 is substantially the same as that of other embodiments previously described herein.

More specifically in Figures 11 and 12 dome shaped, i.e., hemispherical, protuberances or teeth 108 are formed on the backs of the slips. These rounded teeth have a semi-circular profile or cross-sectional outline. The operation of this embodiment of the invention is similar to that of the first described embodiment. The preferably upwardly facing teeth 101 on the front faces of the slips grip the casing 102 as the casing is lowered, and the slips 100 move downwardly and inwardly with the teeth or protuberances 108 initially sliding on the relatively softer surface 107 of the bowl 103. Then when the unit stress between the teeth or protuberances 108 and surface 107 exceeds the yield point of the bowl surface, the protuberances dig into the bowl, plastically deforming and gallingly engaging same.

Instead of using teeth or protuberances permanently attached to the backs of the slips 100 as in the previously described embodiments, ball bearings could be used as shown at 110 in Figures 13 and 14, placed at regular intervals in holes 111 in the backs of the slips and staked into position; alternatively the smooth balls could be similarly secured to the bowl. The operation of these embodiments is substantially the same as that of the embodiments previously described.

Referring now to Figures 15–17, there is shown a further embodiment of the invention in which the casing 130 is supported on slips 131 whose back faces 132 seat directly in conical bowl 133 in the casing head 134. The usual seal between the casing and casing head above the slips is shown at 135 between supporting ring 136 and compression ring 137.

As best shown in Figures 16 and 17, the conical bowl of casing head 134 has a plurality of dome shaped protuberances 140 formed thereon at preferably regular intervals. These may be formed by adding material to the bowl with an arc welding rod. The welded on material will be harder than the bowl and the backs of the slips.

The operation of the embodiment of the invention shown in Figures 15–17 is similar to that of the previously described embodiments. The preferably upwardly facing teeth 141 on the front faces of the slips grip the casing as the casing is lowered and the slips move downwardly and inwardly on the bowl 133. Then when the unit stress between protuberances 140 and the back surfaces of the slips exceeds the yield point of the slips, the protuberances dig into the slips and retard further downward motion thereof, thus reducing the total inward motion of the slips under full load and preventing excessive load from being applied to the casing that might collapse it or cause it to bottleneck.

In this embodiment of the invention the slips should be hardened only on their front faces, leaving the backs of the slips soft enough for the weld metal to dig into the slips. However if it is desired to heat treat and harden the slips all over, the protuberances could be applied to the backs of the slips instead of the face of the bowl, in which case the arrangement would be very nearly the same as in Figures 1 and 4 except for the absence of a hanger. It will be understood that the hanger may be eliminated or used with any of the various embodiments of the invention heretofore described, the principal features of the several embodiments being the nature of the contacting surfaces of the backs of the slips and the face of the bowl, whether the bowl is integral with the casing head or is in a separate hanger. However certain embodiments of the invention as respects the contact surfaces of slips and bowl are better suited for use with a bowl and others without, and they have been shown in each case in the preferred combination.

In reviewing the foregoing embodiments of the invention it will be noted that in all cases means is provided between the backs of the slips and the bowl to control the "coefficient of friction" or, perhaps more accurately, the "coefficient of sliding resistance" or ratio of the force required to cause sliding of the slips on the bowl to the normal force between them, that is, the force perpendicular to their contacting surfaces. The ratio is controlled so as to increase rapidly whenever the normal force reaches a predetermined critical value. In this way the total sliding of the slips relative to the bowl is reduced, thereby reducing the radially inward motion of the slips to prevent collapse of the pipe held by the slips. In all cases the critical loading of the slips at which the coefficient of friction increases should not only be less than that which corresponds to excessive pipe deformation but should be greater than the loading needed to make the slips grip the pipe firmly.

A comparison between the various embodiments of the invention may be made on the basis of the profile of the means used to control or vary the coefficient of friction or sliding resistance between the backs of the slips and the face of the bowl:

(I) In the embodiments of Figures 1 through 10 and 18 through 20 protuberances or teeth are provided that are flat crested.

(II) In the embodiments of Figures 11 through 17, protuberances or teeth are provided that are rounded at their crests. Teeth that are rounded or flattened at their crests may be classified under the generic term "oblate" teeth. None of the teeth have sharp crests.

The foregoing embodiments of the invention show its application to the suspension of casing in a casing head.

It is to be understood however that this invention is of wider applicability and is useful whenever a pipe is to be gripped by wedges and it is desired to limit the stress on the pipe. The invention can be used to suspend tubing as well as casing. Although the gripping of the backs of the slips to the bowl renders the invention of less utility where the suspension is not permanent, e.g. in the case of drill pipe suspended in a rotary table, there may nevertheless be some instances where use of the invention in nonpermanent suspensions will be very useful. For example, Figure 18 shows an overshot used in fishing operations. The tools there shown are conventional except for the contacting surfaces of the slips 150 and bowl 151 which may be formed to provide a variable "coefficient of sliding resistance" according to any of the methods previously described so as to prevent collapse of the fish 152. As illustrated, slips 150 are provided with flat crested teeth 153 as in the Figure 1 embodiment.

Not only is the invention useful to prevent collapse of pipe but it can be used to prevent its bursting as in the case of the fishing spear shown in Figure 19. The spear is conventional except for the contacting surfaces of the slips 160 and expander 161 which are formed to provide a "coefficient of sliding resistance" increasing sharply before the load reaches such a value as to cause bursting of pipe 162. Again, any of the methods previously described or other similar method can be used to control the "friction." As shown, flat crested teeth 163 are provided on the back or inner faces of the slips, the teeth 164 on the front or outer faces of the slips being conventional, e.g., upwardly pointing. It will be noted that whether the slips move radially in or out under load, it is the vertical or cylindrical face which has the ordinary teeth and the inclined or conical face at which the variable coefficient of friction is provided. The vertical face, exposed to grip the load, is called the front face; the inclined face, lying against the bowl or expander or other support, is called the back face.

Figure 20 shows an embodiment of the invention in a permanent type production packer which is conventional except for the areas of contact between the hold down slips 170 and upper expander 171, and between hold up slips 172 and lower expander 173 which are provided with means to control the "friction" according to any of the methods previously described or similar methods, so as to prevent bursting of casing 175 when packer 176 is expanded by pulling up on tubing 177. As shown, the slips are provided with flat crested back teeth 178, 179 as in Figure 1.

Plain hold up or hold down releaseable packers for production and cement retaining and other applications can also be made embodying the invention in a manner similar to that illustrated in Figure 20 for a permanent (nonreleaseable) type packer.

While preferred embodiments of the invention have been shown and described, many modifications thereof can be made by one skilled in the art without departing from the spirit of the invention and it is intended to protect by Letters Patent all forms of the invention falling within the scope of the following claims.

I claim:

1. A pipe suspension apparatus comprising support means having an opening therethrough, annular segmented means disposed in said opening, said annular segmented means having a passage therethrough to receive the pipe, pipe gripping means on the interior of said annular segmented means around the periphery of said passage, and cooperative wedging means at the interior of said opening and the exterior of said annular segmented means operable upon downward movement of the pipe relative to the support means to move the annular segmented means radially inward to cause the pipe means to grip and hold the pipe against downward movement relative to said annular segmented means and ultimately thereafter to hold said annular segmented means against downward movement relative to said support means, said cooperative wedging means including a single downwardly converging smooth conical surface on the interior of said support means defining at least a portion of said opening, said cooperative wedging means further including means on the exterior of said segmented means to gall said smooth conical surface when the normal force therebetween exceeds a certain value greater than that existing when said pipe gripping means first holds the pipe against axial motion relative thereto and less than a predetermined value corresponding to excessive radial deformation of the pipe, said means to gall said conical surface comprising a plurality of oblate teeth on the exterior of said annular segmented means, said teeth being harder than said smooth conical surface, the crests of said teeth lying in the surface of a single cone correlative to said single smooth conical surface, the downwardly facing flanks of said teeth making acute angles with the portion of said smooth conical surface therebelow, the upwardly facing flanks of said teeth making an acute angle with the portion of said smooth conical surface thereabove, said toothed portion of said cooperative wedging means being free to move under the force of gravity in a direction downward relative to said support means to move said annular segmented means radially into contact with the pipe, said toothed portion of said cooperative wedging means being free to move downwardly relative to the support means under force transmitted thereto from said pipe gripping means when the pipe moves downwardly relative to said annular segmented means prior to said pipe gripping means holding said pipe against axial movement relative to said annular segmented means, the crests of said teeth sliding smoothly on said smooth conical surface with constant area of contact therewith during the initial radial motion of the annular segmented means into pipe holding position, the crests of said teeth indenting said smooth conical surface when said normal force therebetween exceeds said certain value, the downwardly facing flanks of said teeth gallingly engaging said conical surface upon further downward movement of said annular segmented means after said certain normal force has been reached so that the coefficient of sliding resistance between said annular segmented means and said conical surface is increased, said teeth being free to move upwardly relative to said smooth conical surface without the upper flanks thereof gallingly engaging said conical surface upon application of upward force to said annular segmented means upon upward motion of said pipe relative thereto to release the hold of said gripping means.

2. A pipe anchoring device comprising support means, segmented means disposed symmetrically around said support means, pipe gripping means on said segmented means coaxial with the axis of symmetry of said segmented means and facing away from said support means, and pipe actuated means actuated by the pipe moving in contact with the pipe gripping means axially in one direction relative to said support means to move said segmented means radially toward the pipe, said pipe actuated means including smooth axially continuous surface areas on one of the two first said means disposed around said axis and equally flaring therefrom in a direction opposite to said one direction and facing the other of the two first said means, said pipe actuated means further including indenting means harder than said smooth surface areas and disposed around the axis of said other of the two first said means and with a plurality of said indenting means in engagement with said smooth surface areas to gall said smooth surface areas when the normal force therebetween exceeds a certain value greater than that existing when said pipe gripping means engages the pipe sufficiently to prevent relative motion of the pipe and pipe gripping means and less than a predetermined value corresponding to excessive radial deformation of the pipe, said indenting means having portions facing said one direction to hang on said surface areas when galled and resist motion of said segmented means relative to said support means in said one direction, said indenting means having portions dull compared to said pipe gripping means facing said smooth surface areas for movement relative thereto without galling when said normal force is less than said predetermined value.

3. The combination of claim 2 in which said indenting means comprises smooth balls rotatably mounted in said other of the two first said means.

4. The combination of claim 2 in which said indenting means comprises flat crested teeth integral with said other of the two first said means.

5. The combination of claim 2 in which said indenting means comprises rounded protuberances integral with said other of the two first said means.

6. The combination of claim 2 in which said indenting means comprises oblate projections integral with said other of the two first said means.

7. The combination of claim 2 in which said smooth axially continuous surface areas form a conical surface.

8. The combination of claim 7 in which said conical surface is on the interior of said support means forming at least a portion of an opening therethrough and said segmented means is disposed within said opening and has a passage therethrough to receive the pipe.

9. The combination of claim 7 in which said conical surface is on the exterior of said support means forming a tapered mandrel and said segmented means is disposed around the mandrel and said pipe gripping means are on the outer periphery of the segmented means to engage within the pipe which is disposed therearound.

10. A pipe anchoring apparatus comprising a support having surface areas equally flaring from a common axis around which they are disposed, segmented wedge means extending around said axis and having inner and outer surface portions, one of said portions being generally cylindrical and coaxial with said support axis, the other of said portions having surface areas equally flaring from said common axis around which they are disposed, pipe gripping means on said cylindrical surface, said wedge means being disposed on said support with said flaring surface areas of said support and wedge means being adjacent and coaxial and correlative, said wedge means and support being free to move axially relative to each other upon relative axial movement of said support and a pipe gripped by said pipe gripping means, the flaring surface areas on one of said support and wedge means being smooth and axially continuous and the other having a plurality of oblate teeth thereon, the crests of said teeth in any axial plane lying in a single line and engaging the adjacent smooth continuous area, each of said teeth being harder than the smooth continuous area in engagement therewith to slide smoothly thereon when the normal force therebetween is less than the certain value corresponding to said pipe gripping means holding said pipe against axial movement relative thereto and to slide gallingly thereon after said normal force exceeds said certain value but is less than that corresponding to excessive pipe deformation.

11. A pipe anchoring apparatus comprising a support having a generally conical surface portion around the axis thereof, annular segmented wedge means having inner and outer surface portions whose gross configurations are coaxial surfaces of revolution, one of said inner and outer surface portions being generally conical and the other being generally cylindrical, pipe gripping means on said cylindrical surface, said wedge means being disposed on said support with said conical surface portions adjacent and coaxial and correlative, said wedge means and support being free to move axially relative to each other upon relative axial movement of said support and a pipe gripped by said pipe gripping means, one of said generally conical surface portions being smooth and axially continuous, the other of said generally conical surface portions having a plurality of oblate teeth thereon, the flanks of said teeth being unloading upon movement of said wedge means in a direction away from the apex of the conical surface portion thereof, the crests of said plurality of teeth lying on the surface of a single cone and engaging said smooth conical surface portion, said teeth being harder than said smooth conical surface portion.

12. A pipe suspension apparatus comprising a support having an opening therethrough, said support having a generally conical surface portion around the interior thereof in said opening, annular segmented wedge means having a generally cylindrical passage therethrough and a generally conical surface portion around the exterior thereof, pipe gripping means on the surface of said cylindrical passage, said wedge means being disposed in said opening with its said conical portion resting on said conical surface portion of said support and free to move axially upon application of axial force thereon by said pipe gripping means, one of said generally conical surface portions being smooth and axially continuous, the other of said generally conical surface portions having a plurality of oblate teeth thereon, the flanks of said teeth being unloading upon movement of said wedge means in a direction away from the apex of the conical surface portion thereof, the crests of said plurality of teeth lying on the surface of a single cone and engaging said smooth continuous conical surface portion, said teeth being harder than said smooth conical surface portion.

13. The combination of claim 12 in which said oblate teeth are each symmetrical in all directions about a line normal to the center of the crest thereof and are on said support and said support is a well head.

14. A pipe suspension apparatus comprising a support having an opening therethrough, said support having a smooth axially continuous conical interior surface defining at least a portion of said opening, annular segmented wedge means having a generally cylindrical passage therethrough and a generally conical portion on the exterior thereof, pipe gripping means on the surface of said cylindrical passage, said wedge means being disposed in said opening with said conical portion resting on said conical surface and free to move axially upon application of axial force thereon by said pipe gripping means, a plurality of oblate teeth on said conical portion, the flanks of said teeth being unloading upon movement of said wedge means in a direction away from the apex of the conical surface portion thereof, the crests of said plurality of teeth lying on the surface of a single cone and engaging said smooth continuous conical surface, said teeth being harder than said conical surface.

15. The combination of claim 14 in which the crests of said teeth are rounded in axial section.

16. The combination of claim 14 in which the crests of said teeth are flat in axial section.

17. The combination of claim 14 in which each of said teeth extends peripherally around said wedge means a distance longer than the axial extent of the tooth.

18. The combination of claim 17 in which the crests of said teeth are flat in axial section.

19. The combination of claim 14 in which each of said teeth is symmetrical about a line normal to the center of the crest thereof.

20. A slip having a generally segmental cylindrical face with sharp teeth on said cylindrical face and having an opposite face tapering relative to the axis of said cylindrical face, said tapering face having oblate teeth thereon, the crests of said oblate teeth lying on the surface of a single cone, the angles defined by the intersection of each of the flanks of each of said oblate teeth with that portion of the surface of said cone defined by the crest intermediate said flanks being at least ninety degrees when measured in a plane passing longitudinally through said axis, the crests of said oblate teeth on said opposite face of the slip defining a surface beneath which all of said opposite face is relieved except said oblate tooth crests, the spacing of said oblate teeth being of the same order of magnitude as the spacing of said sharp teeth.

21. The combination of claim 20 in which said tapering surface is conical and said cylindrical surface is concave.

22. Annular segmented pipe anchoring wedge means having an axial pipe receiving passage therethrough, said wedge means comprising means including sharp teeth disposed in said passage presenting a generally cylindrical pipe gripping surface, means including oblate teeth on the exterior of said wedge means presenting a generally conical wedging surface, the crests of said oblate teeth lying on the surface of a single cone, each of the flanks of each of said oblate teeth cooperating with the tooth crest lying therebetween to define therewith an angle of at least ninety degrees, said angle being measured in a plane passing longitudinally through the axis of said passage, the size of said oblate teeth being of the same order of magnitude as the size of said sharp teeth.

References Cited in the file of this patent

UNITED STATES PATENTS

| | | |
|---|---|---|
| 1,909,601 | Young et al. | May 16, 1933 |
| 2,108,499 | Moseley | Feb. 15, 1938 |
| 2,155,380 | Bean | Apr. 25, 1939 |
| 2,230,712 | Bendeler et al. | Feb. 4, 1941 |
| 2,312,487 | Roach et al. | Mar. 2, 1943 |
| 2,491,392 | Osmun | Dec. 13, 1949 |
| 2,551,240 | Bonner | May 1, 1951 |
| 2,609,879 | Webber | Sept. 9, 1952 |

UNITED STATES PATENT OFFICE

CERTIFICATE OF CORRECTION

Patent No. 2,887,754                                             May 26, 1959

Charles F. Johnson

It is hereby certified that error appears in the printed specification of the above numbered patent requiring correction and that the said Letters Patent should read as corrected below.

Column 2, line 55, before "the" insert -- that of --; column 3, lines 38 and 39, for "down. The" read -- down the --; column 7, line 20, beginning with the paragraph starting with "The slips of Figures 11" strike out all to and including "described herein." in line 47, same column.

Signed and sealed this 16th day of August 1960.

(SEAL)
Attest:

KARL H. AXLINE
Attesting Officer

ROBERT C. WATSON
Commissioner of Patents